(12) United States Patent
Rueschhoff et al.

(10) Patent No.: US 6,837,398 B2
(45) Date of Patent: Jan. 4, 2005

(54) VALVE ASSEMBLY FOR A FLUID DISPENSING GUN

(75) Inventors: Kenneth J. Rueschhoff, Wildwood, MO (US); James P. McBroom, House Springs, MO (US); Joseph C. Lott, St. Louis, MO (US)

(73) Assignee: Clayton Corporation, Fenton, MO (US)

( * ) Notice: Subject to any disclaimer, the term of this patent is extended or adjusted under 35 U.S.C. 154(b) by 0 days.

(21) Appl. No.: 10/438,782

(22) Filed: May 15, 2003

(65) Prior Publication Data

US 2004/0226965 A1 Nov. 18, 2004

(51) Int. Cl.$^7$ ................................................ B67D 5/52
(52) U.S. Cl. ..................................... 222/137; 222/145.5
(58) Field of Search ............................. 222/137, 145.5, 222/145.6

(56) References Cited

U.S. PATENT DOCUMENTS

| | | | | |
|---|---|---|---|---|
| 5,163,584 A | * | 11/1992 | Huber et al. ................... 222/1 |
| 5,180,082 A | * | 1/1993 | Cherfane .................. 222/145.2 |
| 5,462,204 A | * | 10/1995 | Finn ........................... 222/137 |
| 6,158,624 A | * | 12/2000 | Grigg et al. ............. 222/145.6 |
| 6,527,203 B2 | * | 3/2003 | Hurray et al. ............... 239/413 |

* cited by examiner

Primary Examiner—Joseph A. Kaufman
(74) Attorney, Agent, or Firm—Harness Dickey & Pierce, P.L.C.

(57) ABSTRACT

In a gun for dispensing a fluid component, a valve assembly controls the dispensing of the fluid component. The valve assembly includes a needle or valve member and a cup assembly having a passage for receiving the needle assembly. A channel system allows flow of the component through the passage past a seal. An actuator assembly may be provided for providing relative movement between the cup assembly and the needle assembly from a valve-closed position to a valve-open position in which the seal is located upstream from a downstream end of the channel system to permit flow of the component through the passage.

6 Claims, 14 Drawing Sheets

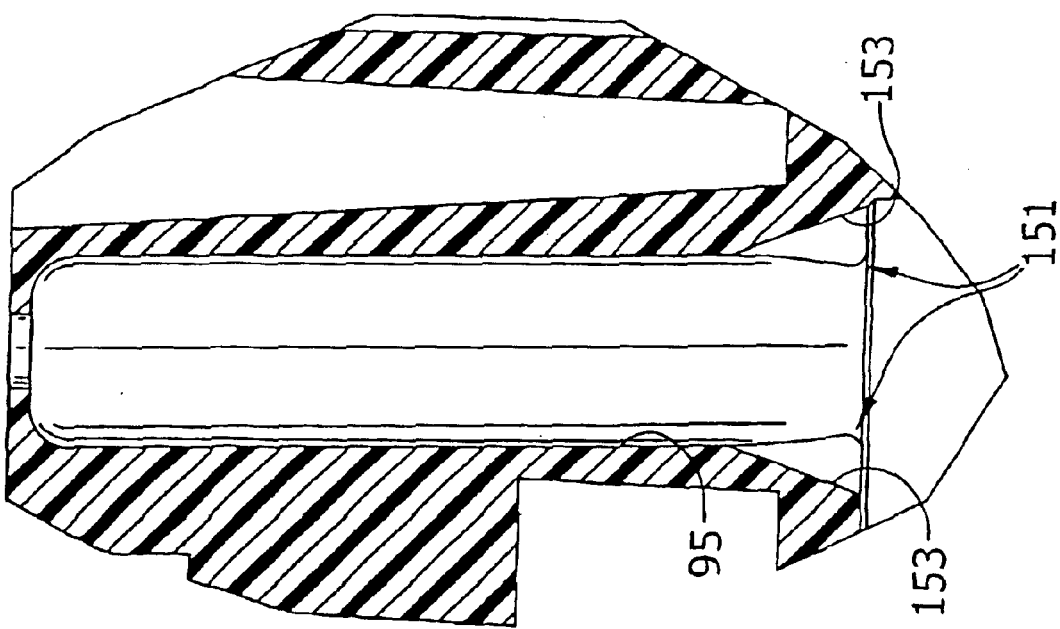

VALVE ASSEMBLY FOR A FLUID DISPENSING GUN

BACKGROUND OF THE INVENTION

The present invention relates to a valve assembly for a fluid dispensing gun adapted to dispense one or more fluid components onto or into a substrate.

A prior art dispensing gun shown in U.S. Pat. No. 6,158, 624 entitled "Foam Dispensing Gun" and assigned to The Clayton Corporation is operable to dispense two fluid components which are mixed in a nozzle of the gun so that the components react with one another to form a foam. In the embodiment shown in the patent, the gun includes a cup 31 having side-by-side fluid flow passages and a valve assembly to control the flow of fluid components through the passage. Each flow passage includes an upstream bore 51 and a downstream bore 53 of smaller diameter. (See FIGS. 2A and 2B of U.S. Pat. No. 6,158,624). The valve assembly comprises a pair of needles 81, each having a forward end received in the downstream bore 53 of each passage. O-rings 85 mounted on rearward ends of the needles seat against shoulders of the cup at the forward ends of the bores 51, thereby sealing the passages against the flow of respective fluid components. Depressing the trigger 141 causes movement of the cup 31 and the shoulders thereon relative to the respective O-rings to allow the components to flow through the flow passages and to be dispensed from the gun.

While the patented design is an improvement over prior designs, control over the flow rate of each fluid component is limited. A relatively small movement of the trigger fully opens the valve assembly so that the fluid components flow through their respective passages at the maximum flow rate. Thus, the flow rate of the fluid components is not easily controlled, especially at low flow rates. Ideally, the flow rate of the fluid components should be controllable through substantially the full range of trigger movement.

The two O-ring seals are often not identically shaped due to manufacturing imperfections or due to deformation or warping that occurs during use of the gun. In a dual component system such as U.S. Pat. No. 6,158,624, if the seals are not identically shaped, then as the valve assembly is opened more of one fluid component may flow past one seal than the other. Thus, the desired ratio of the two components is not maintained.

SUMMARY OF THE INVENTION

Among the several objects of the present invention may be noted the provision of a valve assembly for a fluid dispensing gun which provides more precise control of fluid flow through a full range of flow rates, including low flow rates; the provision of such a valve assembly which provides predictable and reliable fluid flow control; and the provision of such a valve assembly which inhibits exposure of the fluid within the gun to air.

Further among the objects of the present invention is the provision of a dual valve assembly for a fluid dispensing gun which consistently dispenses each of two fluids at a predetermined flow rate to maintain a predetermined ratio of the two fluids.

Briefly, an apparatus of this invention is a gun for dispensing a first fluid component and a second fluid component for mixture thereof. A dual valve assembly in the gun controls the dispensing of the first and second components and comprises a needle assembly including a body and first and second fingers extending from the body. A first fluid flow path extends through the first finger and has an entrance generally at a rearward end of the first finger and an exit generally at a forward end of the first finger. A second fluid flow path extends through the second finger and has an entrance generally at a rearward end of the second finger and an exit generally at a forward end of the second finger. First and second needles are disposed at respective forward ends of the first and second fingers, each needle having a seal thereon. The first and second flow paths are separate from each other such that the first component and the second component do not mix in the needle assembly. A cup assembly includes first and second passages extending through the cup assembly. Each passage has a first section which slidably receives one of the fingers of the needle assembly, and a second section which slidably receives one of the needles and the seal thereon. The second section has an upstream end in fluid communication with the exit of a respective fluid flow path. A wall defines the second section and is adapted for sealing contact by the seal on a respective needle to block flow through the passage. A channel system in the wall extends in a downstream direction from the upstream end of the second section for allowing flow of the respective component through the passage past the seal. The channel system has a downstream end and an upstream end. An actuator assembly provides relative movement between the cup assembly and the needle assembly from a valve-closed position in which the seals on the needles are located downstream from respective channel systems and thereby seal against flow of components through the passages to a valve-open position in which the seals on the needles are located upstream from the downstream ends of respective channel systems to permit flow of the components through the passages.

In another aspect of the invention, a valve assembly in a gun for dispensing a fluid component controls the dispensing of the component. The valve assembly comprises a needle assembly including a body, a finger extending from the body and a fluid flow path extending through the finger and having an entrance generally at a rearward end of the finger and an exit generally at a forward end of the finger. A needle is disposed at a forward end of the finger and has a seal thereon. A cup assembly includes a passage extending through the cup assembly. The passage has a first section which slidably receives the finger of the needle assembly, and a second section which slidably receives the needle and the seal thereon. The second section has an upstream end in fluid communication with the exit of the fluid flow path. A wall defining the second section is adapted for sealing contact by the seal on the needle to block flow through the passage. A channel system in the wall extends in a downstream direction from the upstream end of the second section for allowing flow of the component through the passage past the seal. The channel system has a downstream end and an upstream end. An actuator assembly provides relative movement between the cup assembly and the needle assembly from a valve-closed position in which the seal on the needle is located downstream from the channel system and seals against flow of the component through the passage to a valve-open position in which the seal on the needle is located upstream from the downstream end of the channel system to permit flow of the component through the passage.

In yet another aspect of the invention, a valve assembly for the gun comprises a passage extending through at least a portion of the valve assembly for allowing flow of the component and a valve member adapted to be received in the passage. A seal is mounted in one of the passage and the valve member and a section of one of the passage and the valve member is adapted for sealing contact by said seal to shut off flow through the passage. A bypass system in the section is provided for allowing flow of the component through the passage past the seal. The passage and the valve member are adapted for relative movement between a valve-closed position in which the seal shuts off flow through the passage and a valve-open position which allows the component to flow through the bypass system past the seal.

Other objects and features of the present invention will be in part apparent and in part pointed out hereinafter.

BRIEF DESCRIPTION OF THE DRAWINGS

FIG. 9 is an enlarged view similar to FIG. 7 but showing an alternate embodiment of a channel system in a passage of the cup;

Corresponding reference characters indicate corresponding parts throughout the several views of the drawings.

DETAILED DESCRIPTION OF THE PREFERRED EMBODIMENT

Figure 1:
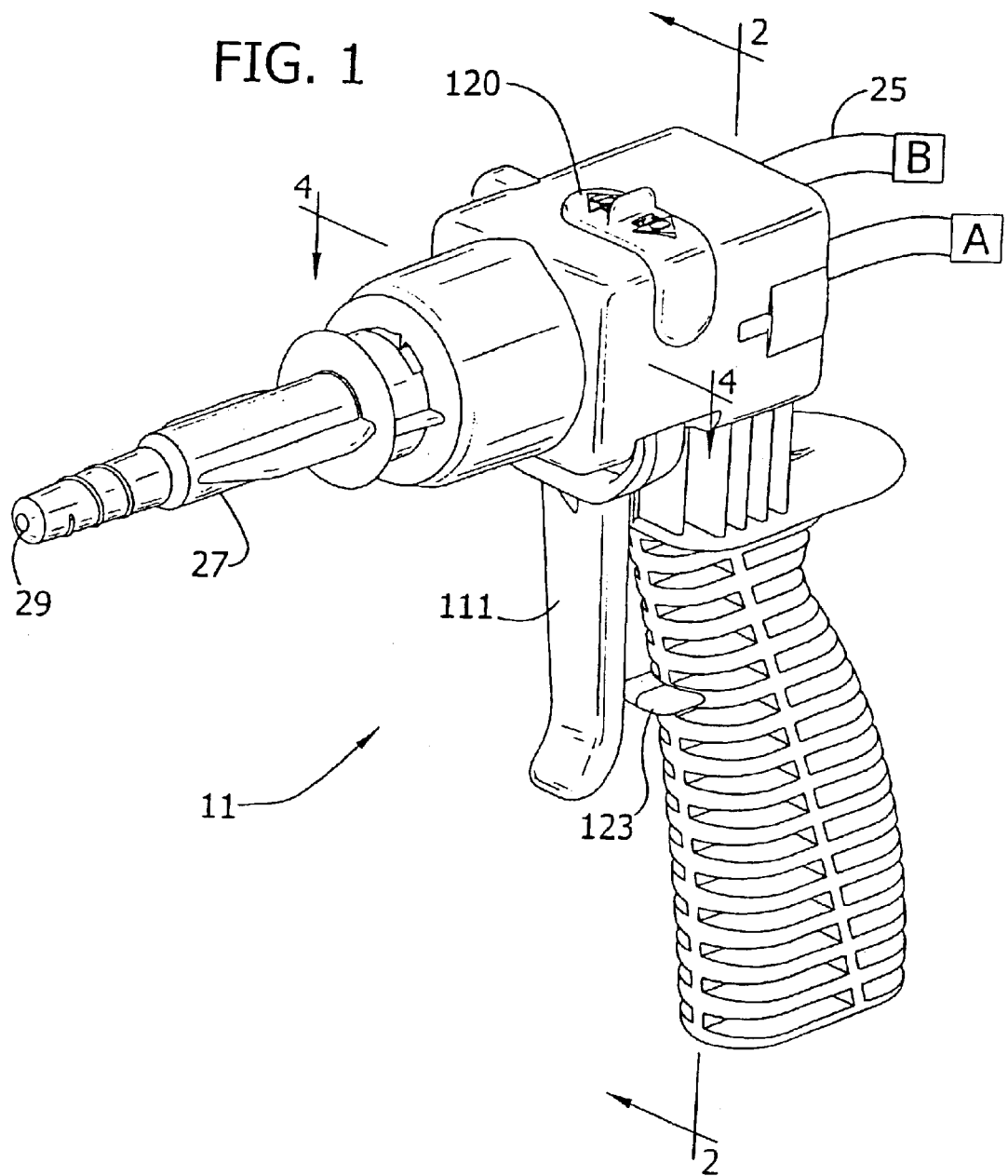
FIG. 1 is a perspective view of a dispensing gun incorporating a dual valve assembly of the present invention.
Figure 2:
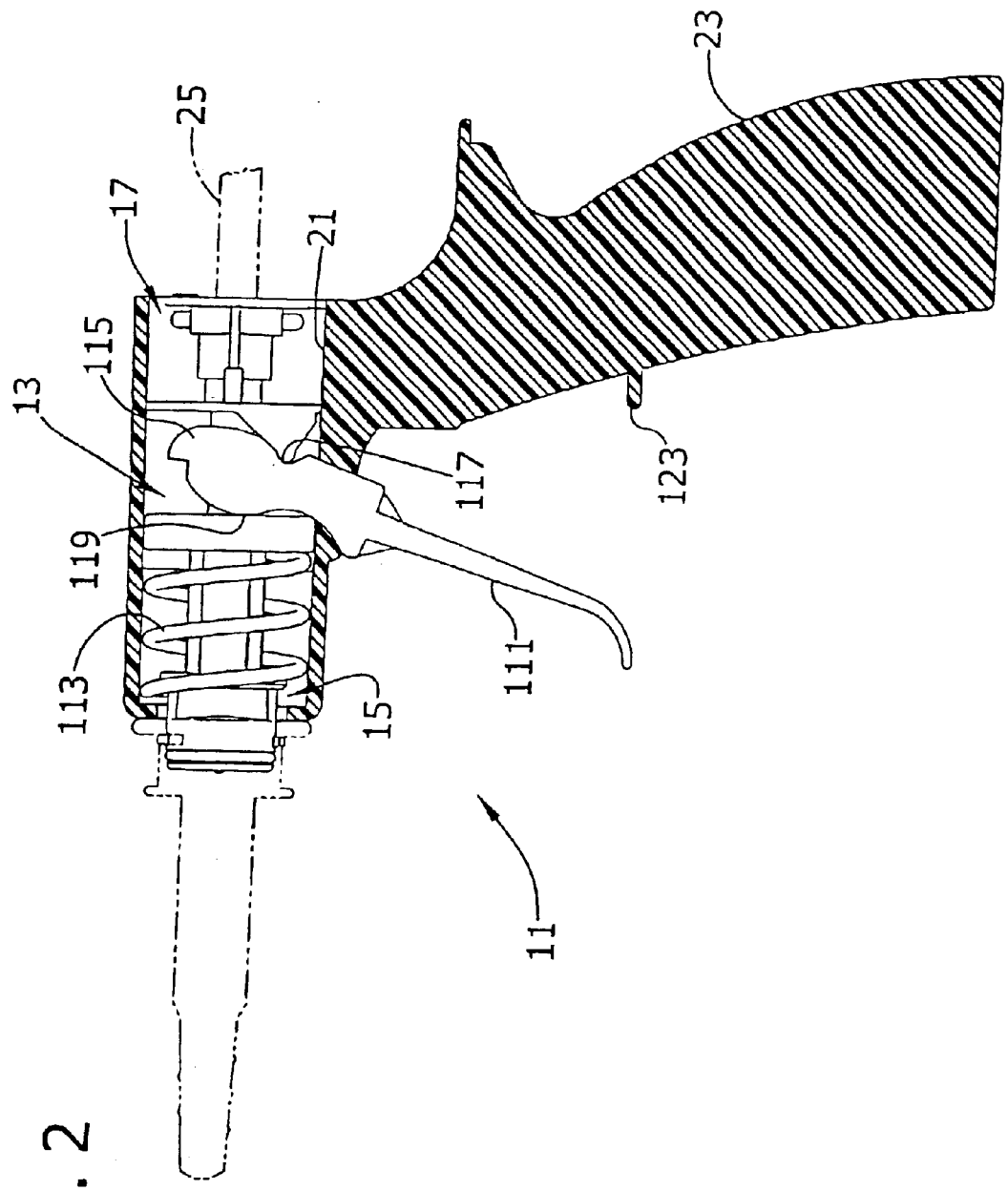
FIG. 2 is a partial vertical section view of the gun taken in a plane including line 2—2 of FIG. 1, a nozzle and component supply lines being shown in phantom.
Figure 3:
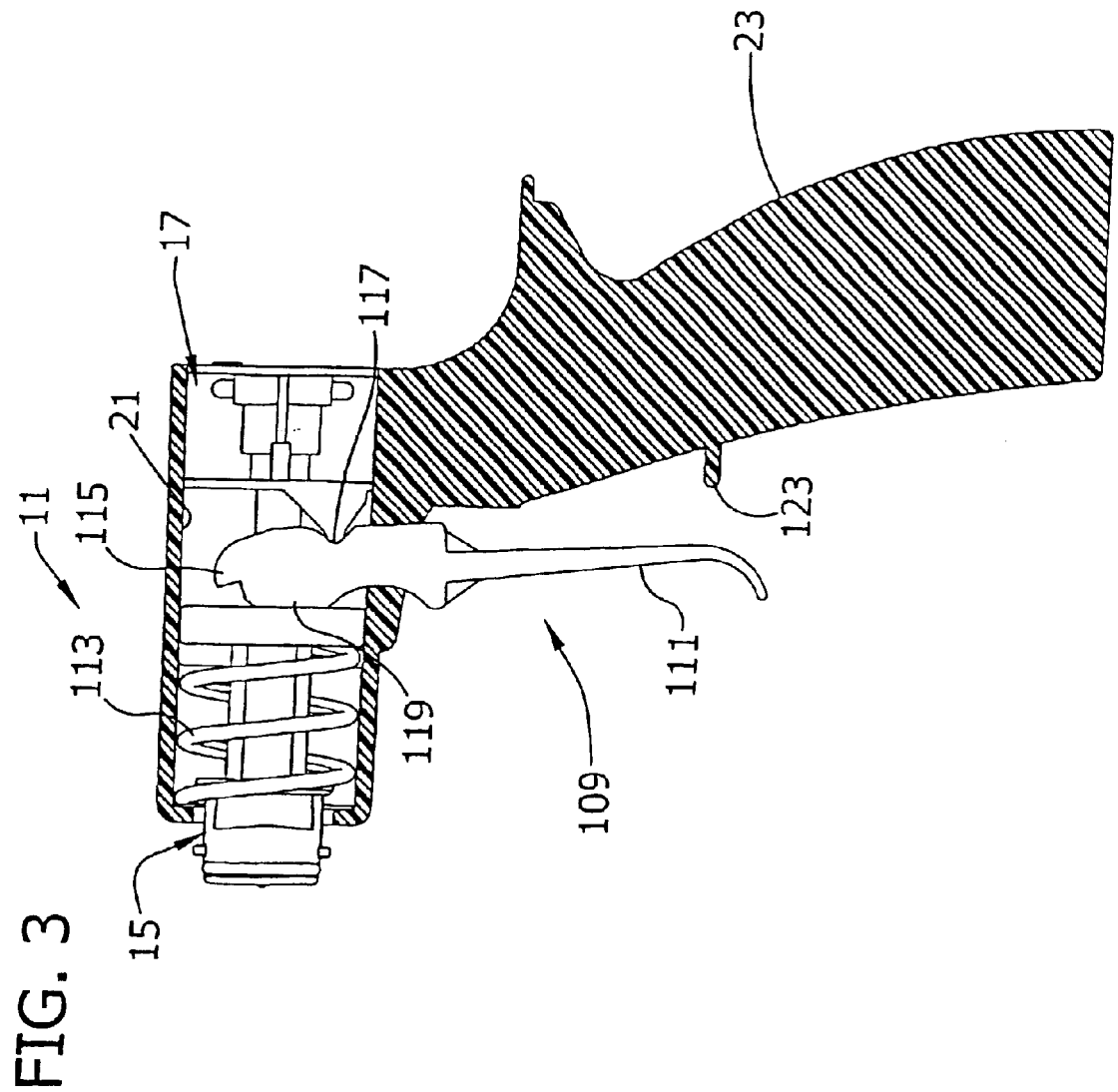
FIG. 3 is a partial vertical section view like FIG. 2 except showing a trigger of the gun in a depressed position.

Referring now to the drawings and in particular to FIGS. 1–3, a fluid dispensing gun, generally designated 11, includes a dual valve assembly, generally designated 13, of the present invention. In this particular embodiment, the valve assembly comprises a cup assembly, generally designated 15, and a needle assembly (generally, valve member), generally designated 17, which are movable relative to one another. The dual valve assembly 13 of this embodiment is adapted for controlling the dispensing of a first fluid component A and a second fluid component B for mixture thereof. Although a dual valve assembly 13 is shown in this embodiment, the valve assembly may include any number of valves for dispensing any number of fluid components within the scope of this invention. For example, a single valve assembly may be used in a gun (not shown) for receiving and dispensing a single fluid component.

Generally, the gun includes a hollow housing 21 and a handle 23 attached to the housing. Preferably, the housing 21 and handle 23 are integrally formed as a one-piece molded plastic structure. Separate sources of the components A, B are connected to the gun 11 via supply lines 25 (e.g., flexible hose, at the right of the gun in FIG. 2) or other suitable means. In this embodiment, the gun 11 is adapted for dispensing foam, which exits the gun through a conventional, removable nozzle 27 (at the left of the gun). The nozzle is adapted for mixing the components as described in co-assigned U.S. Pat. No. 6,158,624, which is incorporated herein by reference. The mixed components of this embodiment react with each other to form a foam (e.g., a homogeneous polyurethane foam) that exits the gun 11 through an outlet 29 of the nozzle 27 and thereafter expands and cures. Other fluid components, e.g., adhesives, may be dispensed within the scope of this invention. Component A may include, e.g., a polyfunctional isocyanate, polyfunctional epoxide, polyfunctional silicone or silane coupled with a blowing agent or agents, and component B may include, e.g., polyglycols, polyamines or polyamidamines coupled with a blowing agent or agents. Other fluid component systems, e.g., adhesives, sealants or coatings, may be dispensed within the scope of this invention.

Figure 4:
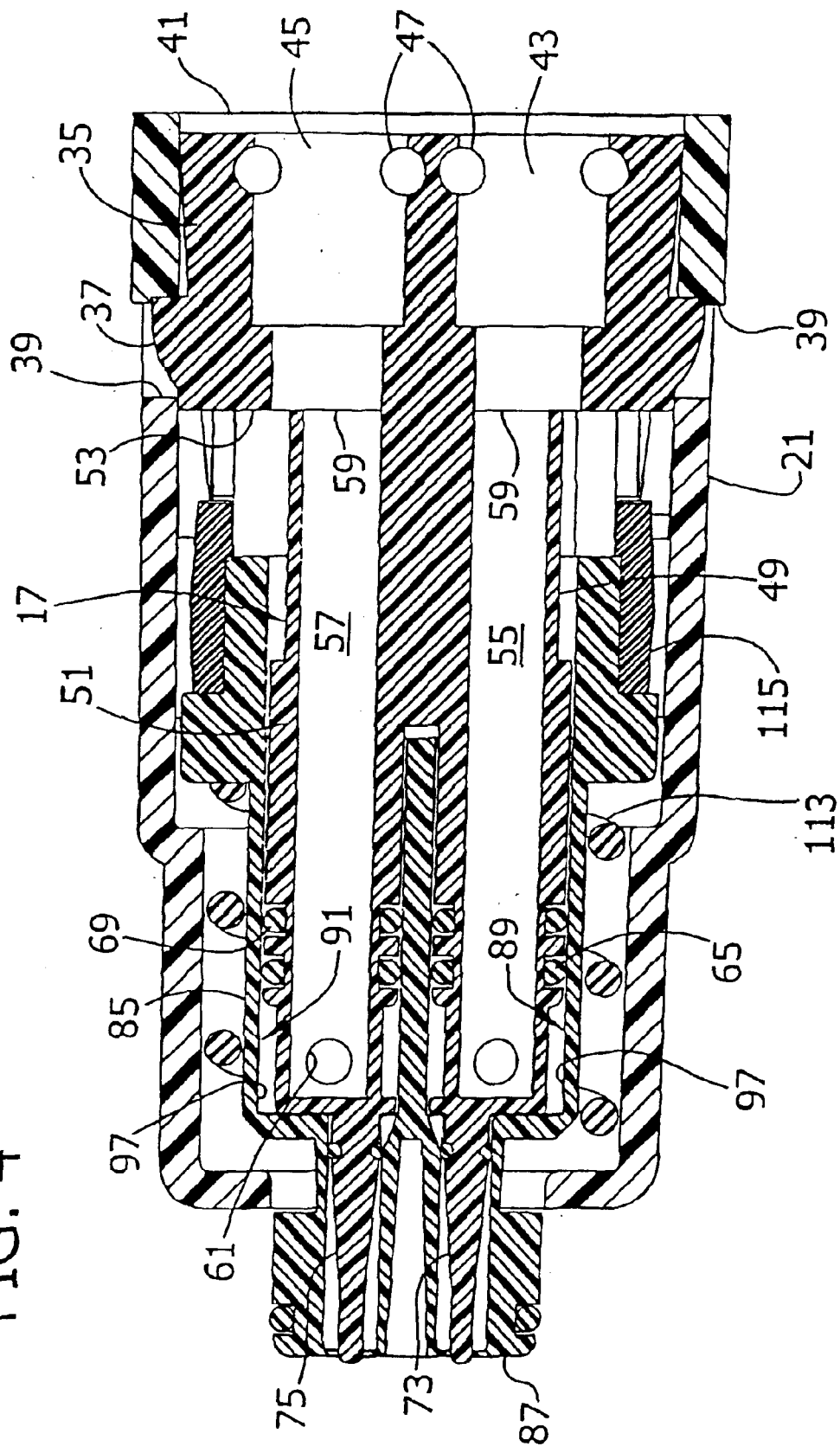
FIG. 4 is a horizontal section view taken in a plane including line 4—4 of FIG. 1 showing the dual valve assembly, including a cup assembly and a needle assembly, other features of the gun being omitted for clarity.
Figure 4A:
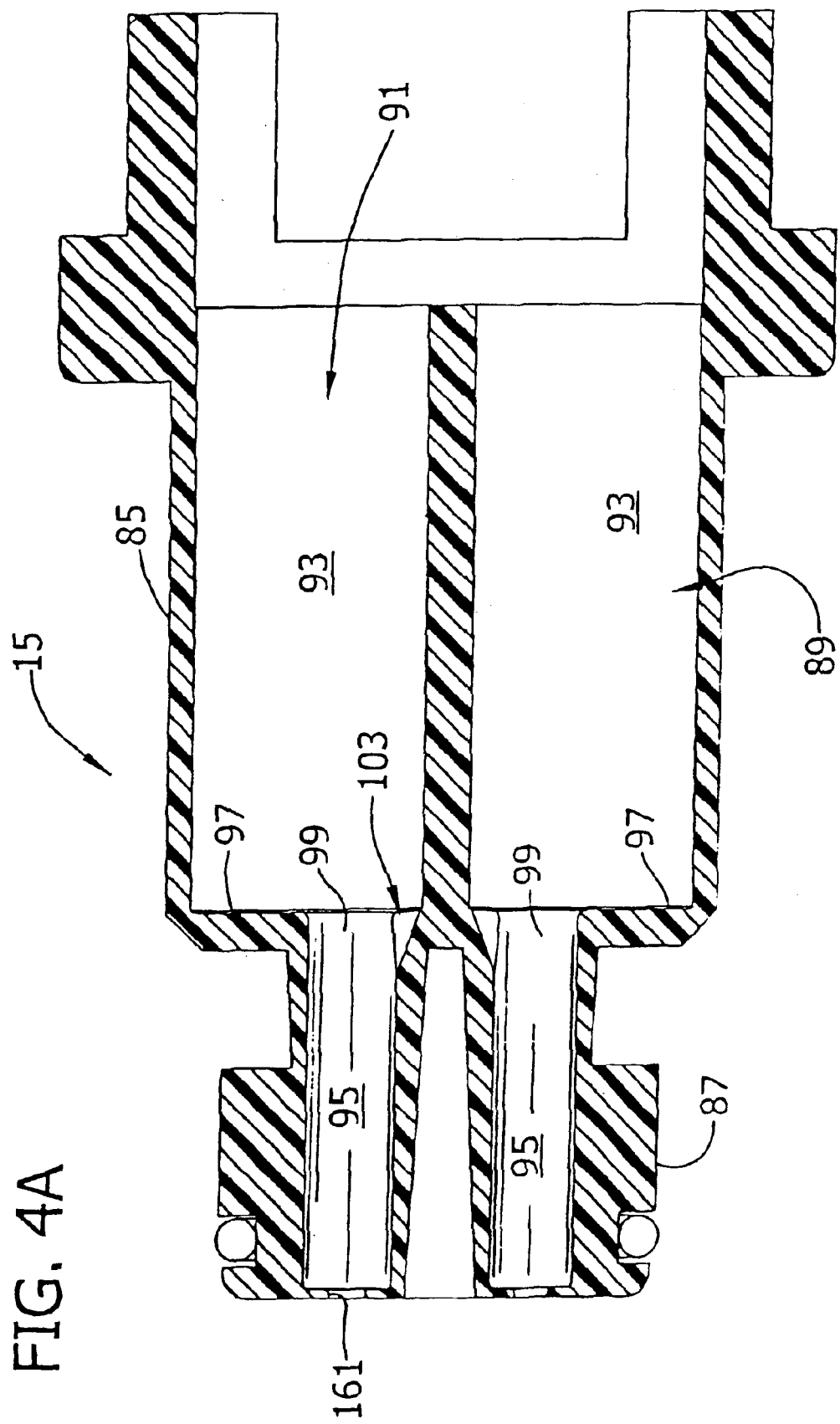
FIG. 4A is a horizontal section view of the cup assembly.
Figure 4B:
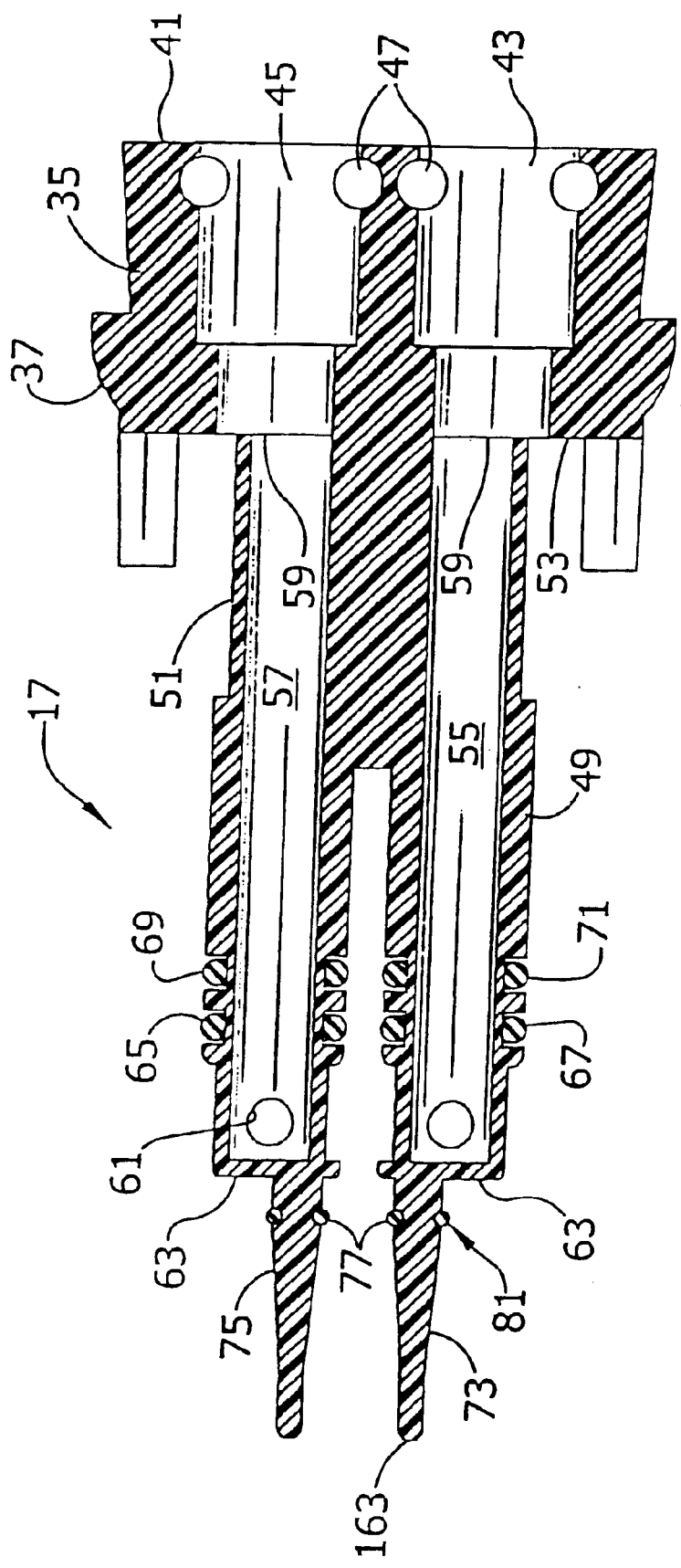
FIG. 4B is a horizontal section view of the needle assembly.

Referring to FIGS. 4 and 4B, the needle assembly 17 of the dual valve assembly 13 includes a body 35 sized to be received within the gun housing 21 and having tangs 37 on opposite sides. The housing is formed with openings 39 on opposite sides for receiving the tangs 37 to secure the needle assembly in the housing. The body 35 of the needle assembly includes a rearward end 41 having separate, side-by-side first and second inlets, respectively designated 43 and 45, for receiving ends of the supply lines 25 which carry the fluid components (FIG. 2, note the supply lines are omitted from FIG. 4 for clarity). The supply lines 25 may be suitably secured in respective inlets by retainers 47.

First and second fingers or tubes, respectively designated 49 and 51, extend forward in the gun housing from a forward end 53 of the body 35, and first and second fluid flow paths 55, 57 extend through the first 49 and second 51 tubes. The first and second flow paths 55, 57 are separate from each other so that the first component A and the second component B do not mix with one another in the needle assembly. Each flow path has an entrance 59 generally at a rearward end of the respective tube and an exit 61 generally adjacent a forward end 63 of the respective tube. The entrance 59 of the first flow path 55 is in fluid communication with the first inlet 43, and the entrance of the second flow path 57 is in fluid communication with the second inlet 45. The exit 61 of each flow path 55, 57 is defined by at least one and preferably two holes formed in the respective tube. The holes defining the exit 61 are disposed forward of a primary rearward seal 65 mounted in a circumferential groove 67 around the tube. In this embodiment, a secondary rearward seal 69 is mounted in another circumferential groove 71 around the tube 49, 51 spaced rearward from the primary rearward seal 65. Only one rearward seal or more than two rearward seals may be used without departing from the scope of this invention.

Figure 5:
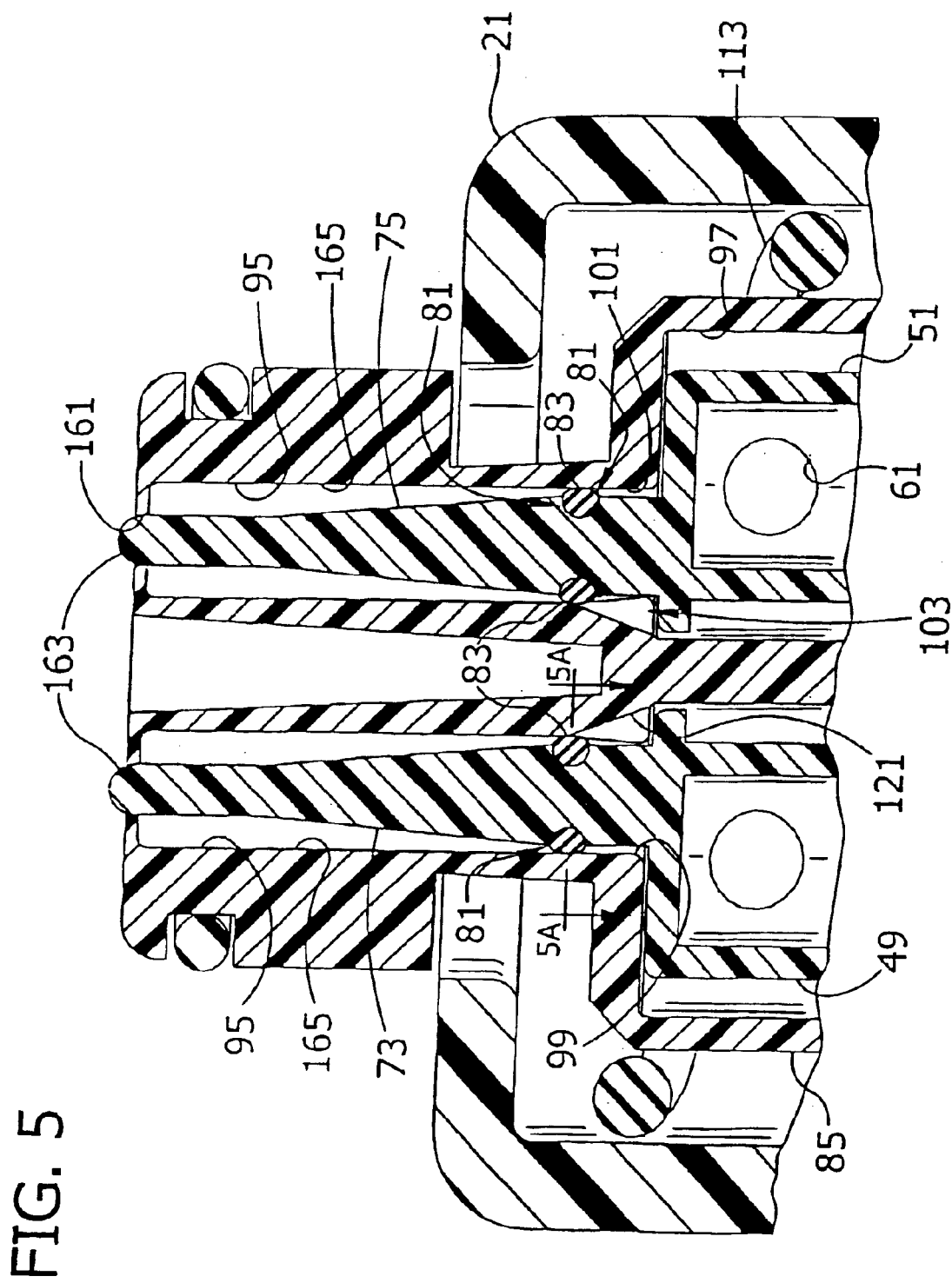
FIG. 5 is an enlarged view of portions of the needle assembly and the cup assembly shown in FIG. 4, the valve assembly being shown in a valve-closed position.

Referring to FIGS. 4 and 5, the needle assembly 17 further includes first and second needles 73, 75 disposed at respective forward ends 63 of the first and second tubes 49, 51. Each needle 73, 75 has a generally cylindric rear portion 77 having a circumferential groove 67 in which a forward seal, generally designated 81, is mounted. The forward seal is an O-ring in this embodiment, but other seals are contemplated within the scope of this invention. The forward seal 81 defines a seal periphery 83 that extends outwardly from the periphery of the cylindric portion 77 of each needle 73, 75.

In this embodiment, the needle assembly 17 is of one-piece, molded plastic construction. The only elements of the needle assembly 17 formed separately are the seals 65, 69, 81. However, it is contemplated that some or all of the elements of the needle assembly 17 may be formed separately and thereafter secured together by suitable means.

Referring to FIGS. 4 and 4A, the cup assembly 15 comprises a generally hollow cup 85 and a nose 87 projecting forward from the cup. The cup 85 and nose 87 define first and second passages 89, 91 which extend side-by-side through the cup assembly 15. Each passage 89, 91 has a first (back) section 93 which slidably receives one of the tubes 49, 51 of the needle assembly 17, and a second (front) section 95 which slidably receives one of the needles 73, 75 and the forward seal 81 mounted thereon. Once received in the cup assembly 15, the exit 61 of each fluid flow path 55, 57 of the needle assembly 17 is disposed at a forward end 97 of the back section 93 for fluid communication between the exit 61 and the back section. Fluid is sealed within the forward end 97 of the back section 93 by the two rearward seals 65, 69. Note that it is preferred to include the secondary rearward seal 69 because it serves both as a backup to the primary rearward seal 65 and also serves to inhibit air and moisture from contacting fluid residue adjacent the primary rearward seal 63 in the back section and thereby inhibits curing of such residue. As will be understood, the spacing between the primary seal 65 and the secondary seal 69 should be greater than the allowable movement of the cup assembly 15 relative to the needle assembly 17.

Figure 5A:
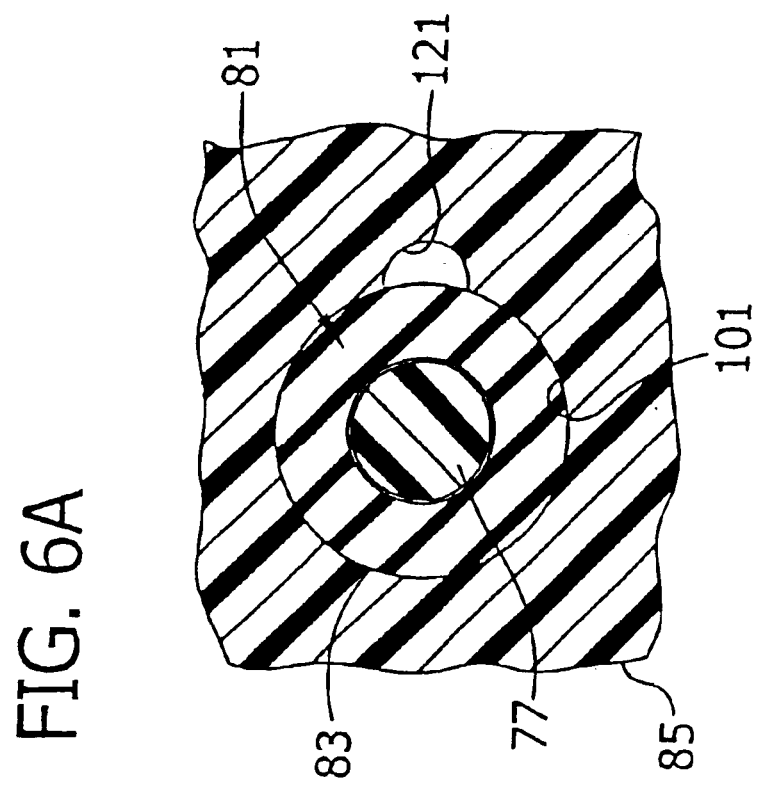
FIG. 5A is a section view taken in a plane including line 5A—5A of FIG. 5.

Each front section 95 of a respective passage 89, 91 in the cup assembly 15 has an upstream end 99 in fluid communication with the forward end 97 of the respective back section so that the upstream end 99 is also in fluid communication with the exit 61 of the respective fluid flow path 55, 57. The front section 9S of each passage 89, 91 is defined in part by a wall 101 extending from the upstream end 99 of the front section 95 to a point downstream from the forward seal 81 when the valve assembly 13 is in a closed position. Each wall 101 is adapted for sealing contact by the forward seal 81 on the respective needle 73, 75 to block flow through the passage 89, 91 when the valve assembly 13 is in the closed position. In this embodiment, the wall 101 is generally cylindric and is sized to receive the generally cylindric rear portion 77 of the needle, and is further sized so that the seal periphery 83 is in sealing contact with the wall (FIG. 5A). The wall 101 and the forward seal 81 may have shapes other than cylindric within the scope of this invention. A bypass or channel system, generally designated 103, in the wall 101 of the front section 95 extends in a downstream direction generally from the upstream end 99 of the front section for allowing flow of the respective component through the passage 89, 91 past the seal 81 (FIGS. 5–8), as will be further described below. Each channel system 103 has a downstream end 105 and an upstream end 107. The nozzle 27 (FIG. 1) is secured to the nose 87 of the cup assembly 15 for receiving the fluid components A, B from the passages 89, 91, as more fully described in U.S. Pat. No. 6,158,624.

Referring to FIGS. 1–4, an actuator assembly generally designated 109 includes a trigger 111 and a coil spring 113. The trigger 111 extends down from the housing 21 forward of the handle 23. Spaced-apart arms 115 (FIGS. 2) extend upwardly from an upper end of the trigger 111 and are mounted within the housing 21 to engage the cup 85 and two fulcrums 117 of the needle assembly 17. When the trigger 111 is pressed toward the handle 23, the arms 115 pivot about the fulcrums 117 in a generally forward direction. A forward surface 119 of each arm engages the cup 85 so that the arms 115 cause the cup to move forwardly when the trigger 111 is pressed. The coil spring 113 is received in the housing 21 and is disposed to surround the cup assembly 15, as more fully described in U.S. Pat. No. 6,158,624. The spring 113 exerts a biasing force rearwardly against the cup assembly 15 to resist the pressure applied to the trigger 111. In the preferred embodiment, the trigger 111 is pulled to move the cup assembly 15 against the bias of the spring 113 from a valve-closed position (FIG. 5) in which the forward seals 81 are located downstream from the respective channel systems 103 to seal against flow of the fluid components A, B through the passages, to a valve-open position (FIG. 6) in which the forward seals 81 are located upstream from the downstream ends 105 of the respective channel systems 103 to permit flow of the fluid components through the passages 89, 91. A trigger lock 120 for preventing accidental discharge of the gun is described in U.S. Pat. No. 6,158,624.

In the embodiment shown in FIGS. 5–8, the channel system 103 in each wall includes one bypass or channel 121. The channel has a tapered, partial conical shape which increases in cross-sectional flow area from the downstream end 105 to the upstream end 107. Thus, as the trigger 111 is pulled, each channel 121 is moved progressively farther downstream relative to the forward seal 81 on a respective needle, and the progressively increasing flow area of the channel 121 allows more fluid flow past the forward seal 81. Accordingly, numerous valve-open positions are defined along the length of the channel 121. As a result, the flow of the respective fluid components A, B may be more precisely controlled, even at relatively low flow rates. One of the valve-open positions defines a maximum valve-open position which permits a maximum rate of flow of the respective components. In this embodiment, the maximum valve-open position is reached when the forward seal 81 is at or adjacent but preferably, not past, the upstream end 99 of the front section. Preferably, the trigger 111 is at or near its maximum travel when the maximum valve-open position is reached. The maximum travel of the trigger 111 is defined by a stop 123 formed on the handle 23. Preferably, the cup assembly 15 travels less than about 0.25 inches from the valve-closed position to the maximum valve-open position, more preferably less than about 0.15 inches and more preferably about 0.1 inches.

Figure 10:
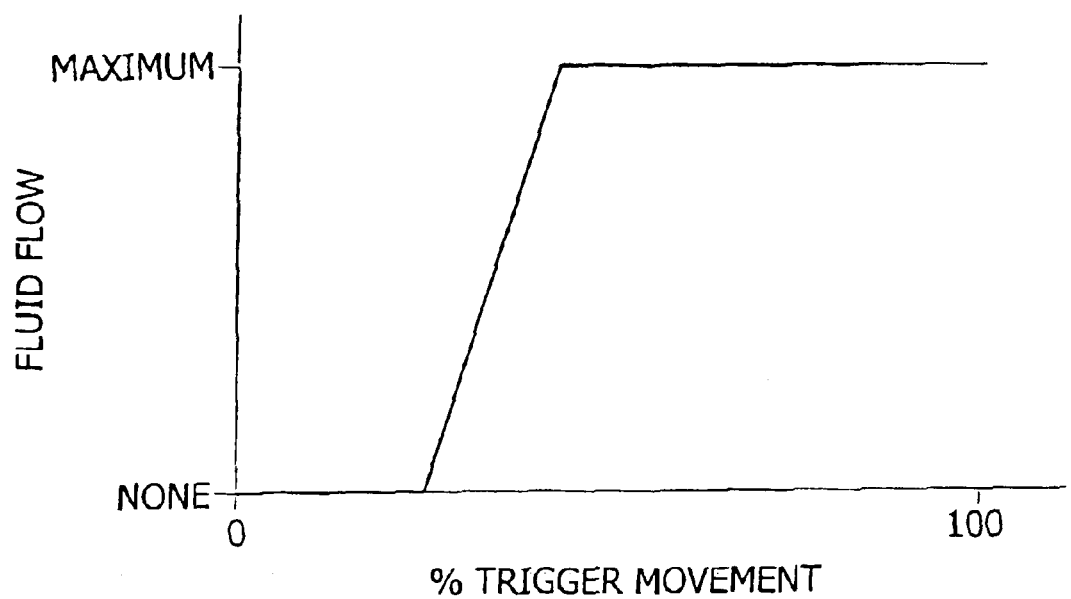
FIG. 10 is a schematic graph of flow rate versus trigger movement for a prior art valve assembly.
Figure 10A:
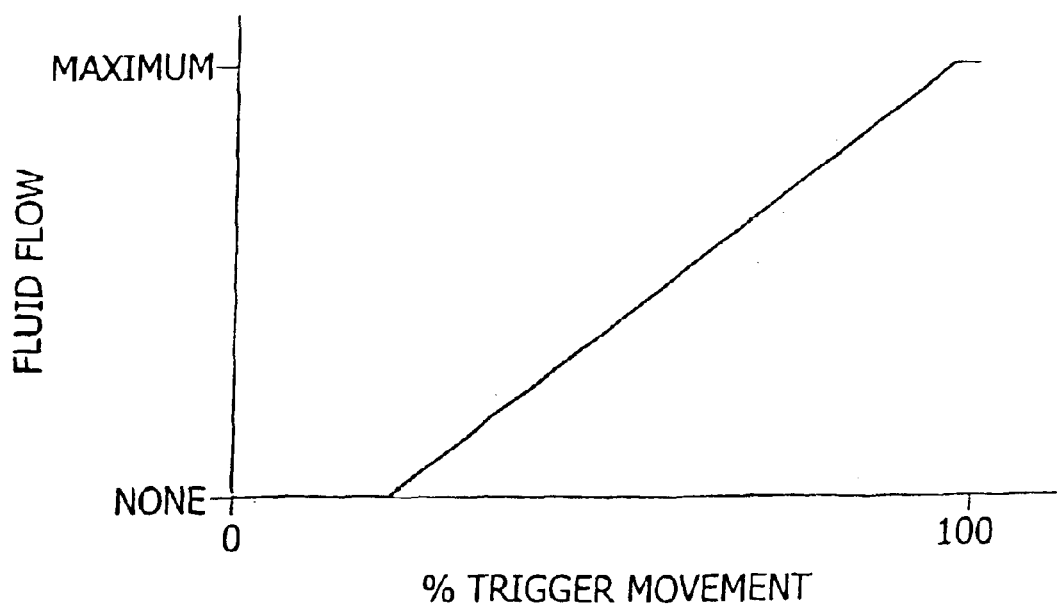
FIG. 10A is a schematic graph of flow rate versus trigger movement for the valve assembly of the present invention.

Prior art valves, such as the valve assembly described in U.S. Pat. No. 6,158,624, are designed such that a relatively small movement of the trigger caused a very rapid increase in the flow rate. FIG. 10 shows a graphical representation of flow rate versus trigger movement for the prior art valve assembly. As can be seen, the valve is fully open upon relatively small trigger movement and is fully open throughout most of the travel of the trigger. Thus, control of the flow is limited in the prior art design. FIG. 10A represents flow rate versus trigger movement for the valve assembly 13 of the embodiment shown in FIGS. 4–8. The valve assembly 13 allows the flow rate to gradually increase as the trigger 111 gradually moves. Such a gradual increase is due to the shape of the channel system 103.

Figure 11:
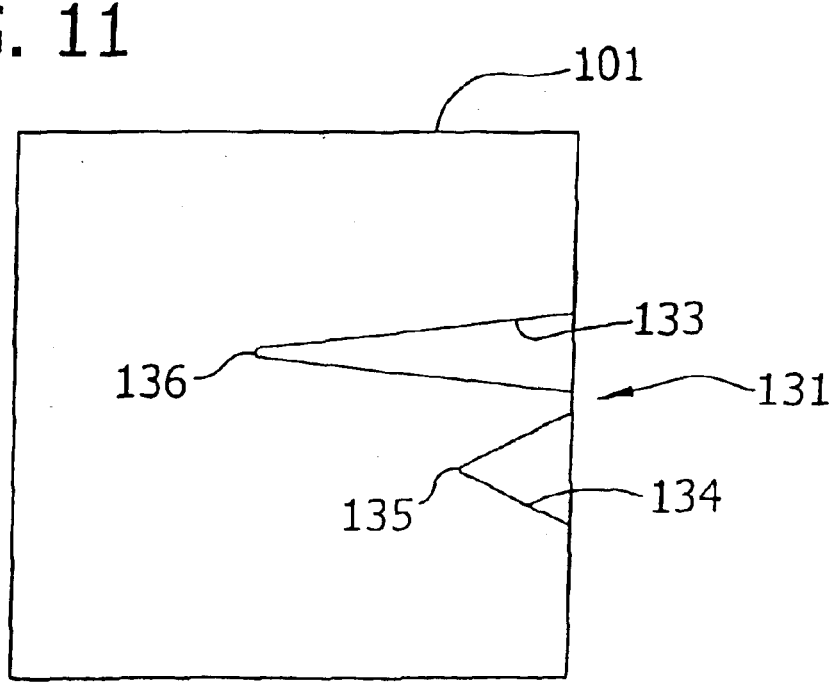
FIG. 11 is a projection view of a cylindrical wall of the passage showing an alternative embodiment of the channel system.
Figure 11A:
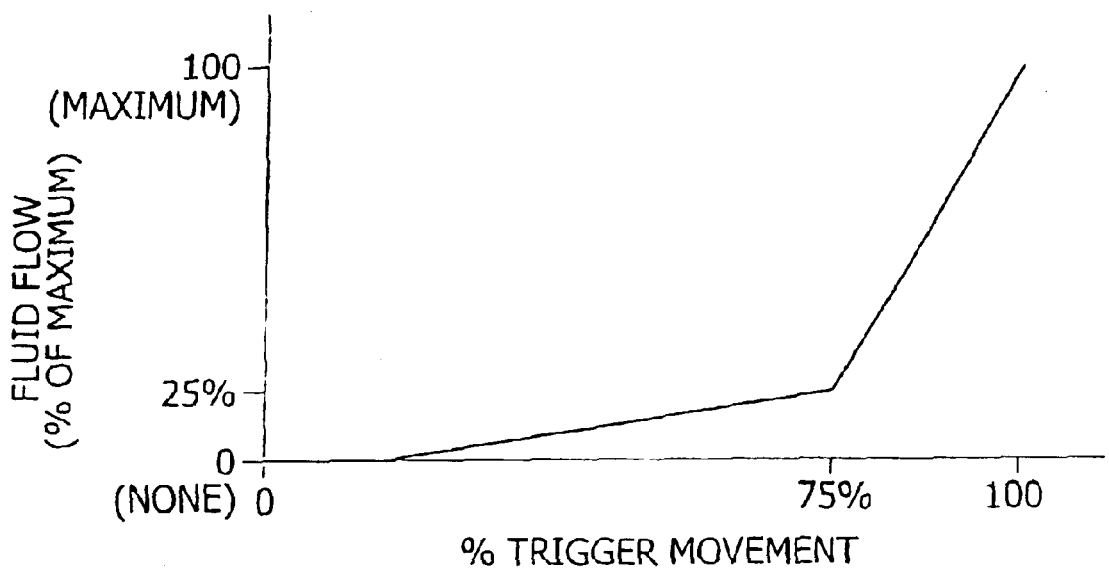
FIG. 11A is a schematic graph of flow rate versus trigger movement for a valve assembly incorporating the channel system of FIG. 11.

In an embodiment shown in FIGS. 11 and 11A, a channel system 131 in each wall 101 includes first and second channels 133, 134. The first and second channels have different cross-sectional flow areas to provide increasing flow as the cup 85 and the channel system 131 therein move relative to the seals 81. Moreover, a downstream end 135 of the second channel 134 is disposed upstream from a downstream end 136 of first channel 133 so that the first and second channels are sequentially exposed as the cup 85 moves relative to the seal 81. In this embodiment, excellent control is provided at low flow rates, e.g., less than 25% of maximum flow which occurs through about 75% of the trigger 111 travel. Thereafter, the flow rate increases significantly because the seal 81 passes upstream of the downstream end 135 of the second channel 134.

Figure 12:
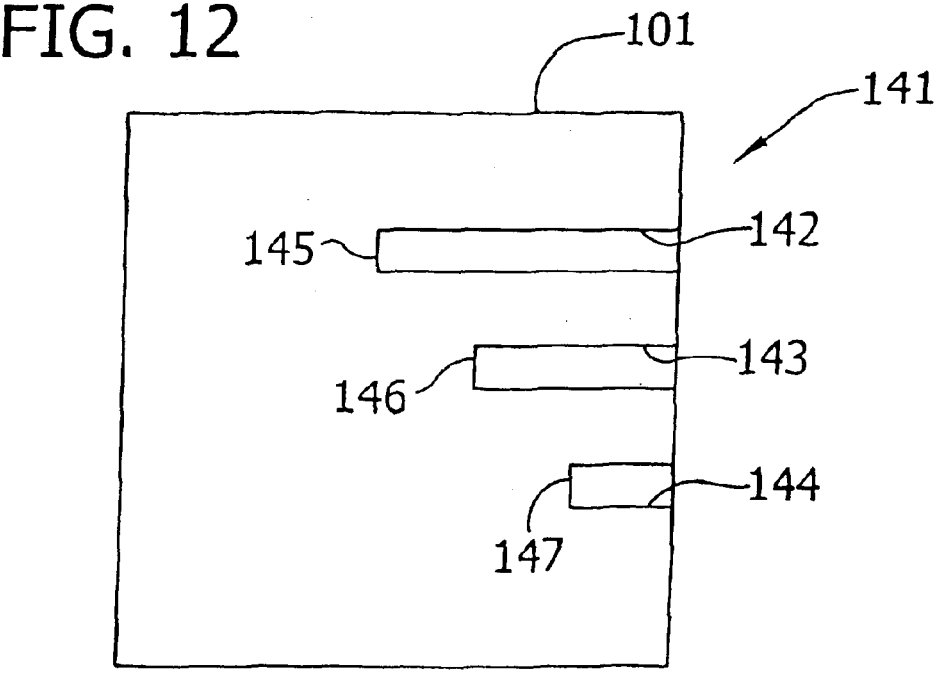
FIG. 12 is a projection view of a cylindrical wall of the passage showing another alternative embodiment of the channel system.
Figure 12A:
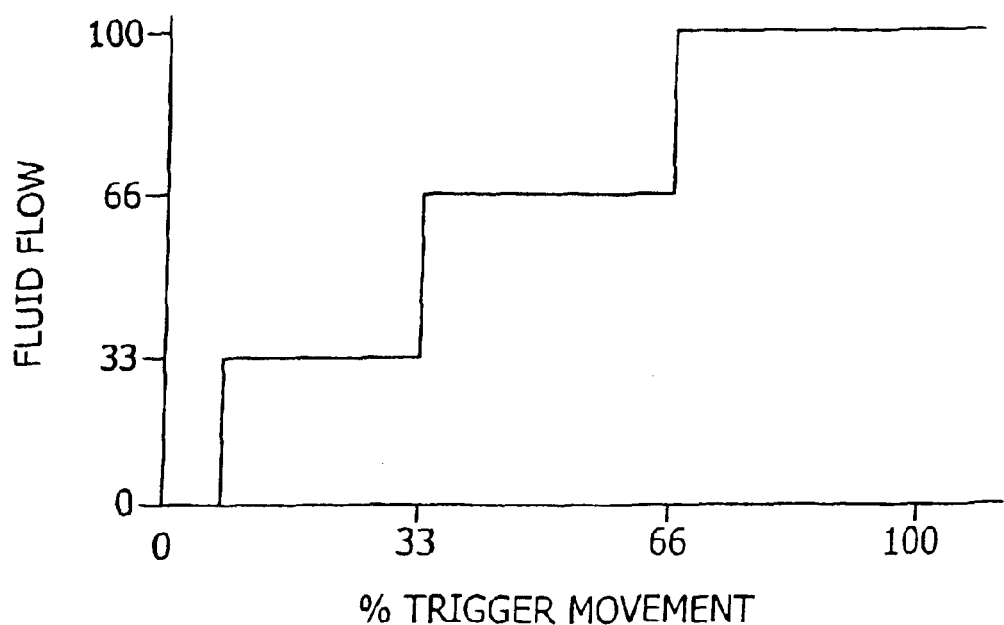
FIG. 12A is a schematic graph of flow rate versus trigger movement for a valve assembly incorporating the channel system of FIG. 12.

In another embodiment shown in FIG. 12, a channel system 141 in each wall 101 includes three channels 142–144, each having the same flow areas. The downstream ends 145–147 of the respective channels 142–144 are spaced apart along the wall so as to be sequentially exposed as the cup 85 moves relative to the seal 81. As shown in FIG. 12A, the graph of flow rate versus trigger movement for the channel system 144 of the this embodiment is a step function.

Other channel systems may be employed. For example, channel systems may be designed which result in a curvilinear plot of flow rate versus trigger movement, rather than a linear plot as shown in these embodiments.

Additionally, the channel system and the seal may be positioned in other elements of the valve assembly, e.g., the channel system may be in the needle and the seal may be in the passage. As stated below, these embodiments are illustrative examples of usable channel systems and shall not be interpreted in a limiting sense.

In the embodiment of FIGS. 4–8, the first and second tubes 49, 51 are twins, the first and second needles 73, 75 are twins, the first and second flow paths 55, 57 are twins, and the first and second passages 89, 91 and the respective channel systems 103 therein are twins for dispensing the components in a one-to-one ratio at any of the valve-open positions. In another alternative embodiment shown in FIG. 9, the channel system 151 in the first passage 89 has two channels 153 so that the cross-sectional flow area of the channel system 151 in the first passage 89 is larger than that of the channel system 103 in the second passage 91 for dispensing more of the first component than the second component. It will be understood that the channel systems in each passage 89, 91 may be designed for any desired ratio of fluid components.

The two forward seals 81 are often not identically shaped due to manufacturing imperfections or due to deformation or warping that occurs during use of the gun. If the seals are not identically shaped, then as the valve assembly 13 is opened, more or less of the fluid component may flow past the seal than is desired. For example, if more of the first fluid component A flows past the first seal than second component B flows past the second seal, a one-to-one ratio, or other predetermined ratio, is not maintained. The channel system in each passage 89, 91 is preferably formed to limit the cross-sectional flow area around the seal periphery 83 at the maximum valve-open position to a section of the periphery that is less than about 75 percent of the periphery, more preferably less than about 50 percent, and even more preferably less than about 20 percent, Because the fluid component passes a smaller area of the seal periphery 83, there is less chance that imperfections or deformations in the seal will affect fluid flow. Accordingly, the channel system 103 of the invention promotes dispensing the components at a predetermined ratio. Stated another way, the channel system 103 more reliably dispenses the components without significant variation from the predetermined ratio.

Figure 6A:
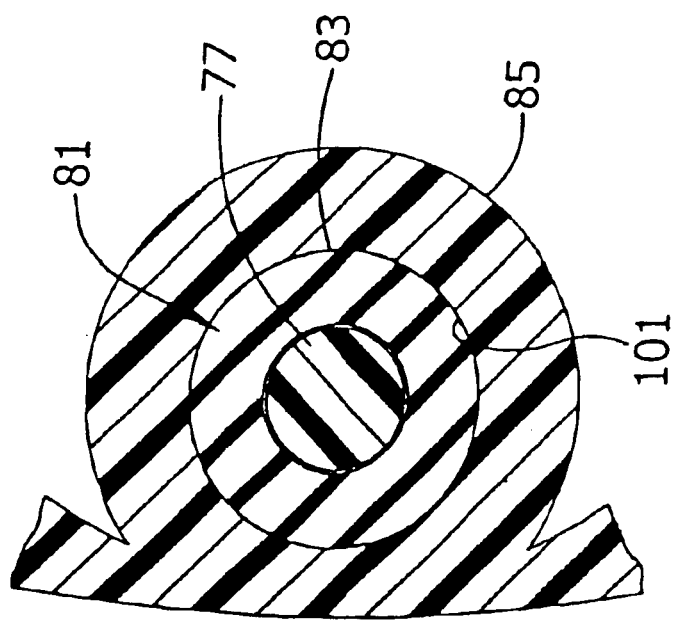
FIG. 6A is a section view taken in a plane including line 6A—6A of FIG. 6.
Figure 6:
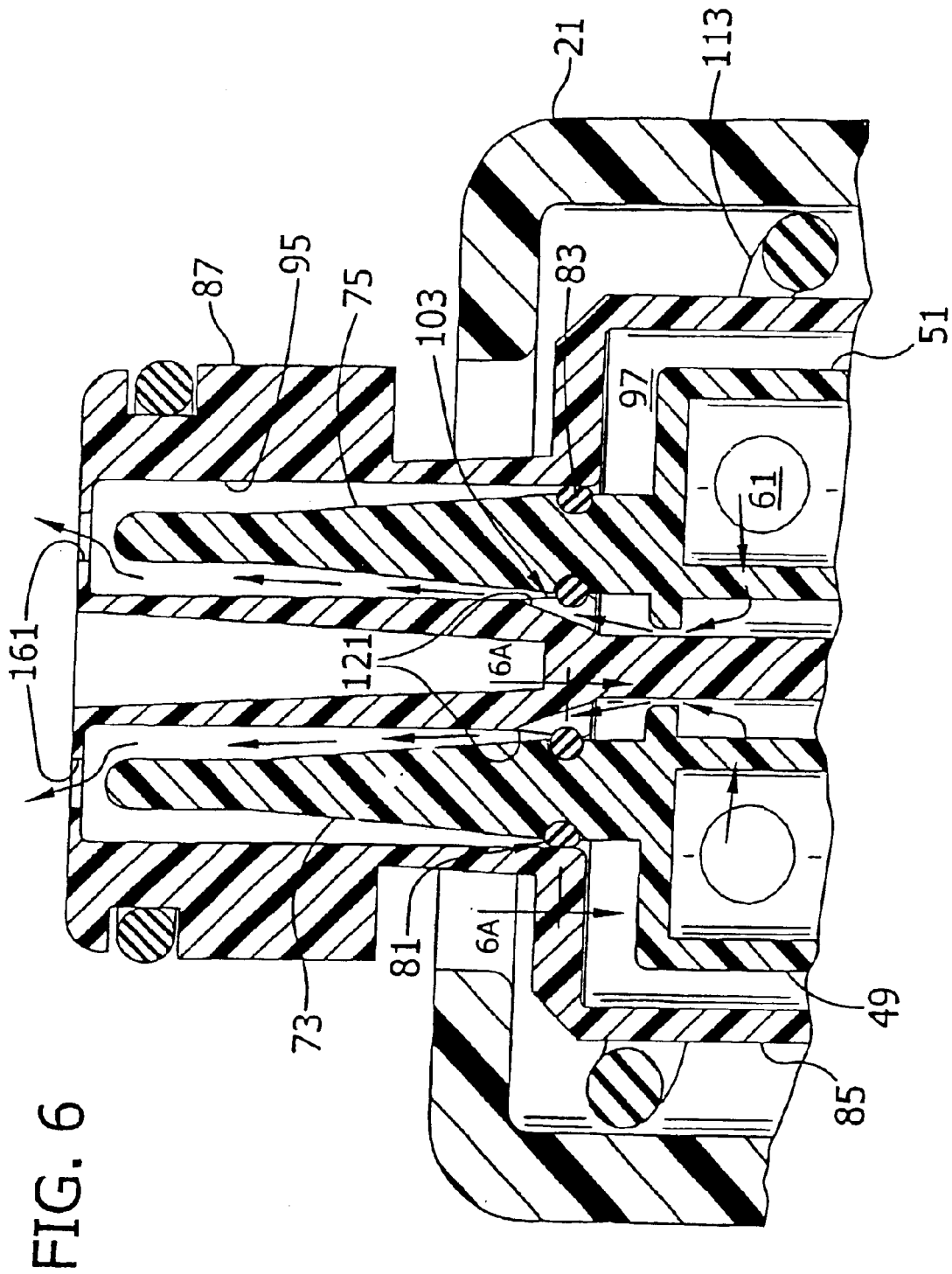
FIG. 6 is an enlarged view of the needles and the cup similar to FIG. 5 but showing the valve assembly in a valve-open position.
Figure 8:
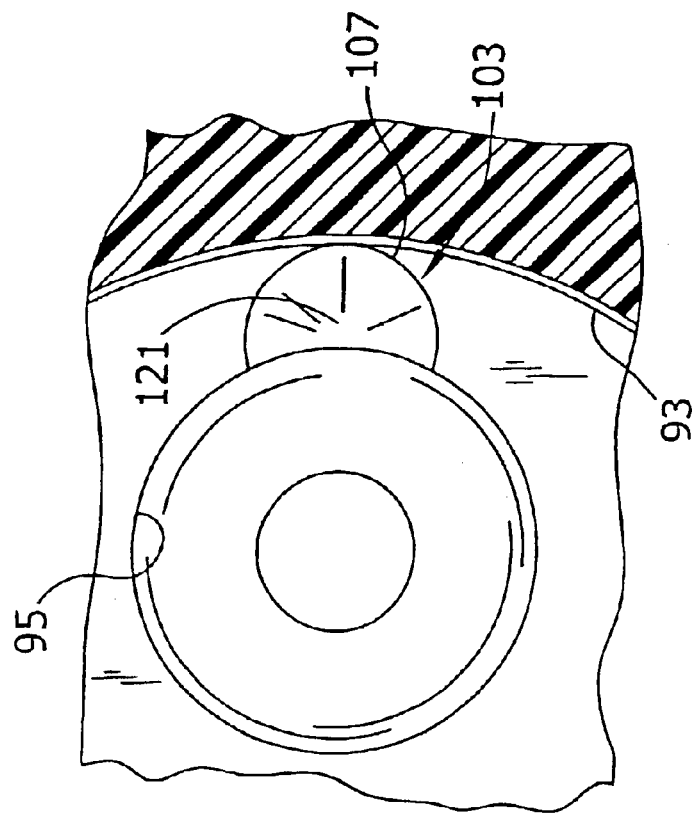
FIG. 8 is a section view taken in a plane including line 8—8 of FIG. 7.
Figure 7:
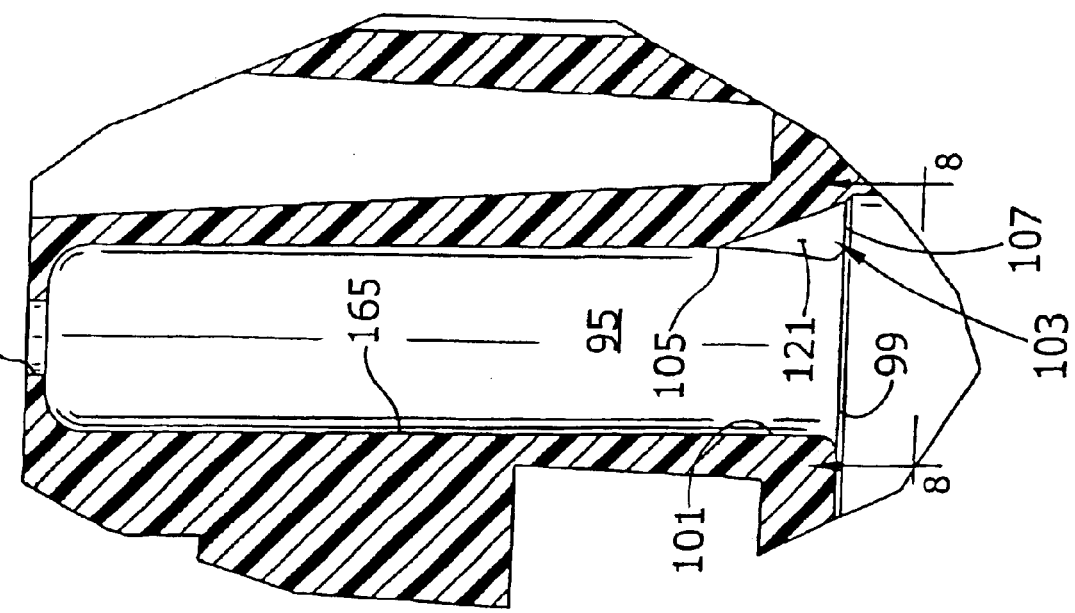
FIG. 7 is an enlarged view of a passage in the cup of the valve assembly.

Referring to FIGS. 5–7, each passage 89, 91 in the cup assembly 15 has an outlet 161 at its downstream end which slidably receives a tip end 163 of the respective needle 73, 75 in the valve-closed position. The tip end 163 of each needle is sized and shaped for sealing engagement with the outlet 161 such that in the valve-closed position air is inhibited from entering the respective passage 89, 91 to thereby inhibit hardening of the respective fluid component remaining in the passage. In this embodiment, the outlet 161 is generally cylindric in shape, and the tip end 163 of each needle likewise has a generally cylindric shape complementary to that of the outlet. Preferably, the tip end 163 of the needle is withdrawn from sealing engagement with the outlet 161 prior to initiation of fluid flow past the seal 81. As shown in FIG. 10A, fluid flow does not begin until the trigger 111 has moved a relatively small amount, e.g., 5–20% of its total travel amount, due to the relative positions of the forward seal 81 and the downstream end 105 of the channel 121 when the valve assembly is in the valve-closed position. As the trigger 111 is moved this small amount, the sealing engagement between the tip end 163 and outlet 161 is broken.

The front section 95 of each cup passage is further defined by a relatively long central wall 165 extending from the cylindric wall 101 to the outlet 161. In the embodiments of FIGS. 5–9, the central wall 165 is generally cylindric and has substantially the same diameter as the cylindric wall 101. The central wall 165 is generally cylindric, but may have a draft of, e.g., 0.5 to 2 degrees, to conform to molding/manufacturing practices. Other shapes of the central wall 165 are contemplated. For example, the central wall 165 may be tapered at a similar angle as each needle 89, 91. Alternatively, the needle 89, 91 may be made cylindric rather than tapered. In other words, the central wall 165 and each needle 89, 91 may have similar or dissimilar shapes within the scope of this invention.

The actuator assembly 109 shown herein is operable to move the cup 85 to a plurality of valve-open positions. However, the actuator assembly, as well as other elements of the valve assembly 17, may be configured so that the valve assembly is moved to only one valve-open position within the scope of this invention. Further, the actuator assembly may be other than the trigger/spring-type actuator shown herein within the scope of this invention.

In view of the above, it will be seen that the several objects of the invention are achieved and other advantageous results attained.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is

What is claimed is:

1. A method of forming an imager cell, the method comprising the steps of:
   forming a first layer of material;
   forming a second layer of material on the first layer of material, the second layer of material having a first conductivity type;
   doping a top portion of the second layer of material to have a second conductivity type;
   forming a third layer of material on the second layer of material;
   forming a fourth layer of material of the first conductivity type on the third layer of material;
   doping a top portion of the fourth layer of material to have the second conductivity type;
   forming a top layer of material of the first conductivity type over the fourth layer of material; and
   doping a top portion of the top layer of material to have the second conductivity type, the top layer of material having a band gap that is larger than a band gap of at least one of the underlying layers of material.

2. The method of claim 1 wherein the second layer of material is doped with a blanket implant.

3. The method of claim 1 and further comprising the step of forming a sinker of the second conductivity type through the third, fourth, and top layers of material to contact the second layer of material.

4. The method of claim 1 and further comprising the step of forming an isolation trench in the fourth and top layers of material to isolate the second region of the second conductivity type from the sinker.

5. The method of claim 1 wherein the fourth and top layers of material are different.

6. The method of claim 1 wherein the second layer of material has a band gap that is less than a band gap of silicon.

* * * * *

UNITED STATES PATENT AND TRADEMARK OFFICE
CERTIFICATE OF CORRECTION

PATENT NO. : 6,837,398 B2
APPLICATION NO. : 10/438782
DATED : January 4, 2005
INVENTOR(S) : Rueschhoff et al.

It is certified that error appears in the above-identified patent and that said Letters Patent is hereby corrected as shown below:

PLEASE DELETE COLUMNS 9 THRU 10 LINES 5-67 AND REPLACE WITH COLUMNS 9 THRU 12 AS SHOWN ON THE ATTACHED PAGES

Signed and Sealed this

Seventeenth Day of October, 2006

JON W. DUDAS
*Director of the United States Patent and Trademark Office* intended that all matter contained in the above description or shown in the accompanying drawings shall be interpreted as illustrative and not in a limiting sense.

What is claimed is:

1. In a gun for dispensing a first fluid component and a second fluid component for mixture thereof, a dual valve assembly for controlling the dispensing of the first and second components comprising:

A. a needle assembly including:
      (a) a body,
      (b) first and second fingers extending from said body,
      (c) a first fluid flow path extending through the first finger and having an entrance generally at a rearward end of the first finger and an exit generally adjacent a forward end of the first finger,
      (d) a second fluid flow path extending through the second finger and having an entrance generally at a rearward end of the second finger and an exit generally adjacent a forward end of the second finger, and
      (e) first and second needles disposed at respective forward ends of the first and second fingers, each needle having a seal thereon,
      (f) said first and second flow paths being separate from each other such that the first component and the second component do not mix in said needle assembly;

B. a cup assembly including:
      (a) first and second passages extending through the cup assembly,
      (b) each passage having a first section which slidably receives one of the fingers of said needle assembly, and a second section which slidably receives one of the needles and the seal thereon, said second section having an upstream end in fluid communication with the exit of a respective fluid flow path, a wall defining said second section adapted for sealing contact by said seal on a respective needle to block flow through said passage, and a channel system in the wall extending in a downstream direction from the upstream end of the second section for allowing flow of the respective component through the passage past the seal, the channel system having a downstream end and an upstream end; and C. an actuator assembly for providing relative movement between the cup assembly and the needle assembly from a valve-closed position in which the seals on the needles are located downstream from respective channel systems and seal against flow of components through the passages to a valve-open position in which the seals on the needles are located upstream from the downstream ends of respective channel systems to permit flow of the components through said passages.

2. A dual valve assembly as set forth in claim 1 wherein the actuator assembly is adapted to provide relative movement of the cup assembly and the needle assembly to a plurality of valve-open positions to thereby vary component flow.

3. A dual valve assembly as set forth in claim 2 wherein each channel system includes one channel which increases in cross-sectional flow area along the length of the channel in an upstream direction to increase the flow of the respective components as the seals are moved upstream to said plurality of valve-open positions.

4. A dual valve assembly as set forth in claim 3 wherein one of said valve-open positions defines a maximum valve-open position for permitting a maximum rate of flow of the respective components, and wherein said one channel has a cross-sectional flow area which increases along the channel whereby relative movement of the cup assembly and the needle assembly from said valve-closed position toward said maximum valve-open position results in a steady increase in the flow rate through each passage.

5. A dual valve assembly as set forth in claim 3 wherein said first and second fingers are twins, said first and second needles are twins, said first and second flow paths are twins, and said first and second passages and the respective channel systems therein are twins for dispensing said components in a one-to-one ratio at any of said valve-open positions.

6. A dual valve assembly as set forth in claim 2 wherein one of said valve-open positions defines a maximum valve-open position for permitting a maximum rate of flow of the respective components, and wherein each seal defines a seal periphery for sealing contact with the wall of the respective second section of the passage, the channel system in each passage being formed to limit flow area around the seal periphery at said maximum valve-open position to a section of the periphery that is less than about 75 percent of the periphery to promote dispensing said components at a predetermined ratio.

7. A dual valve assembly as set forth in claim 6 wherein the channel system in each passage is formed to limit flow area at said maximum valve-open position so that the section of the periphery is less than about 50 percent of the periphery.

8. A dual valve assembly as set forth in claim 6 wherein the channel system in each passage is formed to limit flow area at said maximum valve-open position so that the section of the periphery is less than about 20 percent of the periphery.

9. A dual valve assembly as set forth in claim 1 wherein the channel system in one of the first and second passages has a cross-sectional flow area larger than that of the channel system in the other of the first and second passages for dispensing more of one of the components than the other of the components.

10. A dual valve assembly as set forth in claim 1 wherein each passage further comprises an outlet at a downstream end which slidably receives an end of one of the needles in the valve-closed position, the end of the needle being sized and shaped for sealing engagement with the outlet such that in the valve-closed position air is inhibited from entering the passage to thereby inhibit hardening of the respective component remaining in the passage.

11. A dual valve assembly as set forth in claim 1 wherein each needle includes a generally cylindric portion mounting the seal and each wall of the second section of said passages is generally cylindric, the generally cylindric portion of the needle being received within the generally cylindric wall of the second section so that the seal substantially engages the wall of the second section.

12. A dual valve assembly as set forth in claim 11 wherein the seal on each needle is an O-ring.

13. A dual valve assembly as set forth in claim 1 wherein the actuator assembly includes a trigger adapted to move the cup assembly.

14. In a gun for dispensing a fluid component, a valve assembly for controlling the dispensing of the component comprising:

A. a needle assembly including:
      (a) a body,
      (b) a finger extending from said body,
      (c) a fluid flow path extending through the finger and having an entrance generally at a rearward end of the finger and an exit generally adjacent a forward end of the finger, (e) a needle disposed at a forward end of the finger and having a seal thereon, B. a cup assembly including:
(a) a passage extending through the cup assembly,
(b) the passage having a first section which slidably receives the finger of the needle assembly, and a second section which slidably receives the needle and the seal thereon, said second section having an upstream end in fluid communication with the exit of the fluid flow path, a wall defining said second section adapted for sealing contact by said seal on the needle to block flow through said passage, and a channel system in the wall extending in a downstream direction from the upstream end of the second section for allowing flow of the component through the passage past the seal, the channel system having a downstream end and an upstream end; and C. an actuator assembly for providing relative movement between the cup assembly and the needle assembly from a valve-closed position in which the seal on the needle is located downstream from the channel system and seals against flow of the component through the passage to a valve-open position in which the seal on the needle is located upstream from the downstream end of the channel system to permit flow of the component through the passage.

15. A valve assembly as set forth in claim 14 wherein the actuator assembly is adapted to provide relative movement between the cup assembly and the needle assembly to a plurality of valve-open positions to thereby vary component flow.

16. A valve assembly as set forth in claim 15 wherein the channel system includes one channel which increases in cross-sectional flow area along the length of the channel in an upstream direction to increase the flow of the component as the seal is moved upstream to said plurality of valve-open positions.

17. A valve assembly as set forth in claim 16 wherein one of said valve-open positions defines a maximum valve-open position for permitting a maximum rate of flow of the component, and wherein said one channel has a cross-sectional flow area which increases along the channel whereby relative movement of the cup assembly and the needle assembly from said valve-closed position toward said maximum valve-open position results in a steady increase in the flow rate through the passage.

18. A valve assembly as set forth in claim 15 wherein one of said valve-open positions defines a maximum valve-open position for permitting a maximum rate of flow of the component, and wherein the seal defines a seal periphery for sealing contact with the wall of the second section of the passage, the channel system in the passage being formed to limit flow area around the seal periphery at said maximum valve-open position to a section of the periphery that is less than about 75 percent of the periphery.

19. A valve assembly as set forth in claim 18 wherein the channel system in the passage is formed to limit flow area at said maximum valve-open position so that the section of the periphery is less than about 50 percent of the periphery.

20. A valve assembly as set forth in claim 14 wherein the passage further comprises an outlet at a downstream end which slidably receives an end of the needle in the valve-closed position, the end of the needle being sized and shaped for sealing engagement with the outlet such that in the valve-closed position air is inhibited from entering the passage to thereby inhibit hardening of the component remaining in the passage.

21. A valve assembly as set forth in claim 14 wherein the needle includes a generally cylindric portion mounting the seal and the wall of the second section of the passage is generally cylindric, the generally cylindric portion of the needle being received within the generally cylindric wall of the second section so that the seal substantially engages the wall of the second section.

22. A valve assembly as set forth in claim 21 wherein the seal on the needle is an O-ring.

23. A valve assembly as set forth in claim 14 wherein the actuator assembly includes a trigger adapted to move the cup assembly.

24. In a gun for dispensing a fluid component, a valve assembly for controlling the dispensing of the component comprising:

a passage extending through at least a portion of the valve assembly for allowing flow of the component, a valve member adapted to be received in the passage, a seal mounted in one of the passage and the valve member and, a section of one of the passage and the valve member adapted for sealing contact by said seal to shut off flow through the passage, a bypass system in said section for allowing flow of the component through the passage past the seal, the passage and the valve member being adapted for relative movement between a valve-closed position in which the seal shuts off flow through the passage and a valve-open position which allows the component to flow through the bypass system past the seal.

25. A valve assembly as set forth in claim 24 wherein the bypass system is a single channel formed in a wall of the passage to permit flow of the component around no more than about 50% of the periphery of the seal.

26. A valve assembly as set forth in claim 24 wherein the valve assembly includes a cup assembly, the passage being formed in the cup assembly.

27. A valve assembly as set forth in claim 26 wherein the valve member includes a tube and a needle disposed at a forward end of the tube, the seal being mounted on one of the tube and the needle.

28. A valve assembly as set forth in claim 27 wherein the seal is mounted on the needle.

29. A valve assembly as set forth in claim 27 wherein the passage has a first section which slidably receives the tube of the valve assembly, and a second section which slidably receives the needle and the seal thereon.

30. A valve assembly as set forth in claim 29 wherein the tube includes a fluid flow path extending therethrough and in fluid communication with the passage.

31. A valve assembly as set forth in claim 30 further comprising an actuator assembly for providing relative movement between the cup assembly and the valve member from the valve-closed position to the valve-open position.

32. A valve assembly as set forth in claim 30 wherein an exit of the fluid flow path is disposed generally adjacent a forward end of the tube and wherein the tube includes a primary rearward seal disposed rearwardly of the exit of the fluid flow path for sealing the fluid component in the passage and a secondary rearward seal disposed rearwardly of the primary rearward seal for sealing air and moisture from the passage.

* * * * *

UNITED STATES PATENT AND TRADEMARK OFFICE
CERTIFICATE OF CORRECTION

PATENT NO. : 6,837,398 B2
APPLICATION NO. : 10/438782
DATED : January 4, 2005
INVENTOR(S) : Rueschhoff et al.

It is certified that error appears in the above-identified patent and that said Letters Patent is hereby corrected as shown below:

Delete entire claims, and substitute therefor claims 1-32 as shown on the attached sheets.

Signed and Sealed this

Sixth Day of February, 2007

JON W. DUDAS
*Director of the United States Patent and Trademark Office*

Claims

WHAT IS CLAIMED IS:

1. In a gun for dispensing a first fluid component and a second fluid component for mixture thereof, a dual valve assembly for controlling the dispensing of the first and second components comprising:

A.   a needle assembly including:

(a)   a body, (b)   first and second fingers extending from said body, (c)   a first fluid flow path extending through the first finger and having an entrance generally at a rearward end of the first finger and an exit generally adjacent a forward end of the first finger, (d)   a second fluid flow path extending through the second finger and having an entrance generally at a rearward end of the second finger and an exit generally adjacent a forward end of the second finger, and (e)   first and second needles disposed at respective forward ends of the first and second fingers, each needle having a seal thereon, (f)   said first and second flow paths being separate from each other such that the first component and the second component do not mix in said needle assembly;

B.   a cup assembly including:

(a)   first and second passages extending through the cup assembly, (b)   each passage having a first section which slidably receives one of the fingers of said needle assembly, and a second section which slidably receives one of the needles and the seal thereon, said second section having an upstream end in fluid communication
with the exit of a respective fluid flow path, a wall
defining said second section adapted for sealing
contact by said seal on a respective needle to block
flow through said passage, and a channel system in the
wall extending in a downstream direction from the
upstream end of the second section for allowing flow of
the respective component through the passage past the
seal, the channel system having a downstream end and an
upstream end; and C. an actuator assembly for providing relative
movement between the cup assembly and the needle
assembly from a valve-closed position in which the
seals on the needles are located downstream from
respective channel systems and seal against flow
of components through the passages to a valve-open
position in which the seals on the needles are
located upstream from the downstream ends of
respective channel systems to permit flow of the
components through said passages.

2. A dual valve assembly as set forth in claim 1 wherein the actuator assembly is adapted to provide relative movement of the cup assembly and the needle assembly to a plurality of valve-open positions to thereby vary component flow.

3. A dual valve assembly as set forth in claim 2 wherein each channel system includes one channel which increases in cross-sectional flow area along the length of the channel in an upstream direction to increase the flow of the respective components as the seals are moved upstream to said plurality of valve-open positions.

4. A dual valve assembly as set forth in claim 3 wherein one of said valve-open positions defines a maximum valve-open position for permitting a maximum rate of flow of the respective components, and wherein said one channel has a cross-sectional flow area which increases along the channel whereby relative movement of the cup assembly and the needle assembly from said valve-closed position toward said maximum valve-open position results in a steady increase in the flow rate through each passage.

5. A dual valve assembly as set forth in claim 3 wherein said first and second fingers are twins, said first and second needles are twins, said first and second flow paths are twins, and said first and second passages and the respective channel systems therein are twins for dispensing said components in a one-to-one ratio at any of said valve-open positions.

6. A dual valve assembly as set forth in claim 2 wherein one of said valve-open positions defines a maximum valve-open position for permitting a maximum rate of flow of the respective components, and wherein each seal defines a seal periphery for sealing contact with the wall of the respective second section of the passage, the channel system in each passage being formed to limit flow area around the seal periphery at said maximum valve-open position to a section of the periphery that is less than about 75 percent of the periphery to promote dispensing said components at a predetermined ratio.

7. A dual valve assembly as set forth in claim 6 wherein the channel system in each passage is formed to limit flow area at said maximum valve-open position so that the section of the periphery is less than about 50 percent of the periphery.

8. A dual valve assembly as set forth in claim 6 wherein the channel system in each passage is formed to limit flow area at said maximum valve-open position so that the section of the periphery is less than about 20 percent of the periphery.

9. A dual valve assembly as set forth in claim 1 wherein the channel system in one of the first and second passages has a cross-sectional flow area larger than that of the channel system in the other of the first and second passages for dispensing more of one of the components than the other of the components.

10. A dual valve assembly as set forth in claim 1 wherein each passage further comprises an outlet at a downstream end which slidably receives an end of one of the needles in the valve-closed position, the end of the needle being sized and shaped for sealing engagement with the outlet such that in the valve-closed position air is inhibited from entering the passage to thereby inhibit hardening of the respective component remaining in the passage.

11. A dual valve assembly as set forth in claim 1 wherein each needle includes a generally cylindric portion mounting the seal and each wall of the second section of said passages is generally cylindric, the generally cylindric portion of the needle being received within the generally cylindric wall of the second section so that the seal substantially engages the wall of the second section.

12. A dual valve assembly as set forth in claim 11 wherein the seal on each needle is an O-ring.

13. A dual valve assembly as set forth in claim 1 wherein the actuator assembly includes a trigger adapted to move the cup assembly.

14. In a gun for dispensing a fluid component, a valve assembly for controlling the dispensing of the component comprising:

A.    a needle assembly including:
        (a)    a body,
        (b)    a finger extending from said body,
        (c)    a fluid flow path extending through the finger and having an entrance generally at a rearward end of the finger and an exit generally adjacent a forward end of the finger,
        (e)    a needle disposed at a forward end of the finger and having a seal thereon, B.    a cup assembly including:
        (a)    a passage extending through the cup assembly,
        (b)    the passage having a first section which slidably receives the finger of the needle assembly, and a second section which slidably receives the needle and the seal thereon, said second section having an upstream end in fluid communication with the exit of the fluid flow path, a wall defining said second section adapted for sealing contact by said seal on the needle to block flow through said passage, and a channel system in the wall extending in a downstream direction from the upstream end of the second section for allowing flow of the component through the passage past the seal, the channel system having a downstream end and an upstream end; and C. an actuator assembly for providing relative movement between the cup assembly and the needle assembly from a valve-closed position in which the seal on the needle is located downstream from the channel system and seals against flow of the component through the passage to a valve-open position in which the seal on the needle is located upstream from the downstream end of the channel system to permit flow of the component through the passage.

15. A valve assembly as set forth in claim 14 wherein the actuator assembly is adapted to provide relative movement between the cup assembly and the needle assembly to a plurality of valve-open positions to thereby vary component flow.

16. A valve assembly as set forth in claim 15 wherein the channel system includes one channel which increases in cross-sectional flow area along the length of the channel in an upstream direction to increase the flow of the component as the seal is moved upstream to said plurality of valve-open positions.

17. A valve assembly as set forth in claim 16 wherein one of said valve-open positions defines a maximum valve-open position for permitting a maximum rate of flow of the component, and wherein said one channel has a cross-sectional flow area which increases along the channel whereby relative movement of the cup assembly and the needle assembly from said valve-closed position toward said maximum valve-open position results in a steady increase in the flow rate through the passage.

18. A valve assembly as set forth in claim 15 wherein one of said valve-open positions defines a maximum valve-open position for permitting a maximum rate of flow of the component, and wherein the seal defines a seal periphery for sealing contact with the wall of the second section of the passage, the channel system in the passage being formed to limit flow area around the seal periphery at said maximum valve-open position to a section of the periphery that is less than about 75 percent of the periphery.

19. A valve assembly as set forth in claim 18 wherein the channel system in the passage is formed to limit flow area at said maximum valve-open position so that the section of the periphery is less than about 50 percent of the periphery.

20. A valve assembly as set forth in claim 14 wherein the passage further comprises an outlet at a downstream end which slidably receives an end of the needle in the valve-closed position, the end of the needle being sized and shaped for sealing engagement with the outlet such that in the valve-closed position air is inhibited from entering the passage to thereby inhibit hardening of the component remaining in the passage.

21. A valve assembly as set forth in claim 14 wherein the needle includes a generally cylindric portion mounting the seal and the wall of the second section of the passage is generally cylindric, the generally cylindric portion of the needle being received within the generally cylindric wall of the second section so that the seal substantially engages the wall of the second section.

22. A valve assembly as set forth in claim 21 wherein the seal on the needle is an O-ring.

24

23. A valve assembly as set forth in claim 14 wherein the actuator assembly includes a trigger adapted to move the cup assembly.

24. In a gun for dispensing a fluid component, a valve assembly for controlling the dispensing of the component comprising:
a passage extending through at least a portion of the valve assembly for allowing flow of the component,
a valve member adapted to be received in the passage,
a seal mounted in one of the passage and the valve member and,
a section of one of the passage and the valve member adapted for sealing contact by said seal to shut off flow through the passage,
a bypass system in said section for allowing flow of the component through the passage past the seal,
the passage and the valve member being adapted for relative movement between a valve-closed position in which the seal shuts off flow through the passage and a valve-open position which allows the component to flow through the bypass system past the seal.

25. A valve assembly as set forth in claim 24 wherein the bypass system is a single channel formed in a wall of the passage to permit flow of the component around no more than about 50% of the periphery of the seal.

26. A valve assembly as set forth in claim 24 wherein the valve assembly includes a cup assembly, the passage being formed in the cup assembly.

27. A valve assembly as set forth in claim 26 wherein the valve member includes a tube and a needle disposed at a forward end of the tube, the seal being mounted on one of the tube and the needle.

28. A valve assembly as set forth in claim 27 wherein the seal is mounted on the needle.

29. A valve assembly as set forth in claim 27 wherein the passage has a first section which slidably receives the tube of the valve assembly, and a second section which slidably receives the needle and the seal thereon.

30. A valve assembly as set forth in claim 29 wherein the tube includes a fluid flow path extending therethrough and in fluid communication with the passage.

31. A valve assembly as set forth in claim 30 further comprising an actuator assembly for providing relative movement between the cup assembly and the valve member from the valve-closed position to the valve-open position.

32. A valve assembly as set forth in claim 30 wherein an exit of the fluid flow path is disposed generally adjacent a forward end of the tube and wherein the tube includes a primary rearward seal disposed rearwardly of the exit of the fluid flow path for sealing the fluid component in the passage and a secondary rearward seal disposed rearwardly of the primary rearward seal for sealing air and moisture from the passage.

UNITED STATES PATENT AND TRADEMARK OFFICE
CERTIFICATE OF CORRECTION

PATENT NO. : 6,837,398 B2
APPLICATION NO. : 10/438782
DATED : January 4, 2005
INVENTOR(S) : Kenneth Rueschhoff et al.

It is certified that error appears in the above-identified patent and that said Letters Patent is hereby corrected as shown below:

This certificate supersedes Certificate of Correction issued on February 6, 2007. The Certificate of Correction is to be vacated since corrections to claims has previously issued with reprinted Columns 9-12 consisting of claims 1-32 on October 17, 2006.

Signed and Sealed this

Third Day of April, 2007

JON W. DUDAS
*Director of the United States Patent and Trademark Office*